(12) United States Patent
Flandrin et al.

(10) Patent No.: US 6,790,884 B2
(45) Date of Patent: Sep. 14, 2004

(54) WARP-FREE PIGMENT COMPOSITIONS COMPRISING DIARYLDIKETOPYRROLO[3,4-C]PYRROLES

(75) Inventors: Franck Rey Flandrin, Strasbourg (FR); Guo-Hua Hu, Nancy Cedex (FR); Philippe Bugnon, Essert (CH); Zhimin Hao, Riehen (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 10/100,602

(22) Filed: Mar. 18, 2002

(65) Prior Publication Data

US 2002/0178516 A1 Dec. 5, 2002

Related U.S. Application Data

(62) Division of application No. 09/294,484, filed on Apr. 20, 1999, now Pat. No. 6,409,956.

(30) Foreign Application Priority Data

Apr. 22, 1998 (CH) ............................................... 915/98
Mar. 2, 1999 (CH) ............................................... 380/99

(51) Int. Cl.[7] ......................... C08K 5/3415; C08K 5/23; C08K 5/07
(52) U.S. Cl. .......................... 524/89; 524/90; 524/92; 524/94; 524/190; 524/357
(58) Field of Search ........................ 524/89, 92, 94, 524/90, 357, 190

(56) References Cited

U.S. PATENT DOCUMENTS

| | | | |
|---|---|---|---|
| 3,978,036 A | 8/1976 | Pollard | 264/328.18 |
| 4,233,206 A | 11/1980 | Katsura et al. | 260/42.21 |
| 4,490,542 A | 12/1984 | Iqbal et al. | 548/453 |
| 4,579,949 A | 4/1986 | Rochat et al. | 546/167 |
| 4,585,878 A | 4/1986 | Jost et al. | 548/453 |
| 4,720,305 A | 1/1988 | Iqbal et al. | 106/288 Q |
| 4,791,204 A | 12/1988 | Jost et al. | 548/101 |
| 4,810,304 A * | 3/1989 | Jaffe et al. | 106/494 |
| 4,810,733 A | 3/1989 | Sakuma et al. | 523/206 |
| 4,988,477 A | 1/1991 | Bes et al. | 264/328.18 |
| 5,200,528 A * | 4/1993 | Wooden et al. | |
| 5,240,980 A | 8/1993 | Danielson et al. | 524/190 |
| 5,271,759 A | 12/1993 | Wooden et al. | 106/411 |
| 5,472,496 A * | 12/1995 | Hendi et al. | 106/495 |
| 5,584,922 A * | 12/1996 | Babler | 106/417 |
| 5,693,824 A | 12/1997 | Mizuguchi et al. | 548/453 |
| 5,738,719 A | 4/1998 | Wallquist et al. | 106/494 |
| 5,821,373 A | 10/1998 | Hao et al. | 548/453 |
| 6,036,766 A * | 3/2000 | Hendi et al. | 106/494 |
| 6,036,910 A | 3/2000 | Tamura et al. | 264/401 |

FOREIGN PATENT DOCUMENTS

WO 98/41570 9/1998

OTHER PUBLICATIONS

Chem. Abstr. 90:73304 for JP 53121845 (1978).
Chem. Abstr. 98:127145 for JP 57159831 (1982).
Chem. Abstr. 119:118672 for JP 04372632 (1992).
Bugnon et al., Chimia, vol. 48, No. 9, pp 436–439, (1994).

* cited by examiner

Primary Examiner—Tae H. Yoon
(74) Attorney, Agent, or Firm—Tyler A. Stevenson; Kevin T. Mansfield

(57) ABSTRACT

The invention relates to the use of compounds of the formula (I)

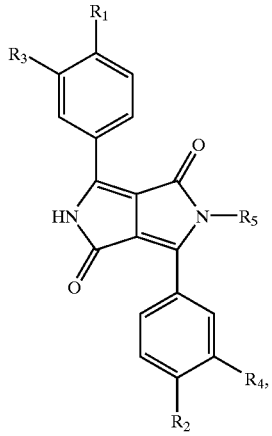

in which $R_1$, $R_2$, $R_3$ and $R_4$ independently of one another are hydrogen, halogen, $R_6$, $OR_6$ or $SR_6$, $R_5$ is hydrogen or linear or branched $C_1$–$C_{12}$alkyl, benzyl or phenethyl, and $R_6$ is an apolar group which is unsubstituted or substituted one or more times by halogen or by $OC_1$–$C_6$alkyl, with the proviso that if $R_5$ is hydrogen, $R_1$, $R_2$, $R_3$ or $R_4$ is $R_6$, $OR_6$ or $SR_6$, as additives in the pigmentation of partially crystalline plastics, especially those processed by injection moulding, with pigments containing at least one each of groups

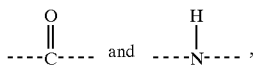

which are joined to one another as

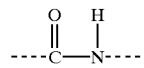

or are in conjugation with one another.

Preferred pigments are quinacridone pigments, disazo condensation pigments, isoindolinone pigments and pyrrolo[3,4-c]pyrrole pigments, especially pyrrolo[3,4-c]pyrrole pigments.

Corresponding formulations and novel compounds are likewise claimed.

By these means it is possible to avoid warping.

7 Claims, No Drawings

WARP-FREE PIGMENT COMPOSITIONS COMPRISING DIARYLDIKETOPYRROLO[3,4-C]PYRROLES

This is a divisional of application Ser. No. 09/294,484 filed on Apr. 20, 1999, now U.S. Pat. No. 6,409,956.

The invention relates to the use of certain diaryldiketopyrrolo[3,4-c]pyrrole derivatives as additives in the pigmentation of partially crystalline plastics, especially those processed by injection moulding. By using such additives it is possible to avoid warping.

In the plastics processing industry, warping following injection moulding is a familiar and severe problem which in the case of partially crystalline plastics is observed in particular in the presence of organic pigments. It is generally assumed that the principal cause of this warping is a nucleation effect induced by the organic pigment particles.

Numerous attempts have already been made, with usually moderate success, to solve this problem, for example by slowing down the injection moulding process, by altering the pigment structure or pigment morphology, by coating the pigment particles, or by means of additives.

Altering the injection moulding parameters is awkward, uneconomic and heavily dependent on the size and geometry of the article being produced. With any change in pigmentation, moreover, laborious adaptation of the parameters is required.

The morphology of the pigment particles can be altered by known methods, for example by milling acicular pigments (including, in particular, phthalocyanines), or by conversion to a different crystal modification or coarser form. The colouristic properties of the pigments, however, are undesirably altered by the change in their morphology. JP 04/372632, for example, proposes diphenyldiketopyrrolo[3,4-c]pyrroles having a specific surface area of 3–15 m²/g, which provide very weak colouring.

EP 498667 describes dyes substituted with polyalkyleneoxy groups, which can be used instead of pigments. The improvement in warping, however, is insufficient, and these dyes have unsatisfactory fastness properties. The same applies to the pentyloxy-substituted phthalocyanines known from JP-53/121845.

U.S. Pat. No. 4,233,206 describes a method of colouring polyolefin articles using methylol-substituted pigments esterified with long-chain acids. However, the pigment properties suffer: for example the migration, especially in the case of classes of pigment whose good properties are based on the presence of primary or secondary amide groups which with this method, however, are substituted by methylol and hence disappear. A further factor is that, in combination with normal pigments, these dyes must be either added in high concentrations or else thoroughly, intimately mixed with the pigment. This method, moreover, yields unsatisfactory results in the case of pigments having a particularly high warping tendency, for example with diketopyrrolo[3,4-c]pyrroles.

As described in Chimia 48/9, 436 [1994], therefore, the best method to date has been to provide the pigment with a polymer coating. However, this method does not permit totally warp-free pigmenting, since in the course of dispersion fracture surfaces, which act as nucleation centres, always form in some of the aggregates.

Finally, it is known that reinforcing agents can be added to the plastic, examples being glass fibres or polyamides as disclosed in JP-57/159831 and WO-98141570. By virtue of such reinforcing agents, however, the material properties are fundamentally—and for the most part undesirably—altered. Depending on the material to be strengthened, compatibility problems arise, and the materials are no longer recyclable to the desired extent The object was therefore to find a process with which partially crystalline plastics can be pigmented in the injection moulding process even with highly warp-promoting pigments, and especially with Colour Index Pigment Red 254 and its analogues, without a change in their mechanical and chemical properties.

EP-511165 discloses diketopyrrolo[3,4-c]pyrrole compounds which have nitrogen-containing groups attached to alkoxy or polyalkyleneoxy chains and which exhibit outstanding rheological properties in coating systems and printing inks.

EP-133156 discloses diketopyrrolo[3,4-c]pyrroles suitable for colouring high molecular mass organic material including, for example, polyolefins. Included in the disclosure, as one of two examples of compounds monosubstituted on the nitrogen, is 1,4-diketo-2-n-butyl-5-hydro-3,6-diphenylpyrrolo[3,4-c]pyrrole, which is suitable as a polyester dye but whose lightfastness is only borderline.

U.S. Pat. No. 4,579,949 and U.S. Pat. No. 4,490,542 disclose, among many other compounds, alkoxy- or alkylthio-substituted diketopyrrolo[3,4-c]pyrroles, but without concrete examples. In this case too, polyolefins are among the many plastics mentioned.

The abovementioned object has been solved in a surprisingly effective way by the use of the colorant combinations of the invention. The dimensional stability is better by far than when using the pigmentations known to date, and the pigmentary properties of the principal component are essentially retained; in very many cases, indeed, warping has completely disappeared.

The invention provides a composition comprising
a pigment containing at least one each of the groups

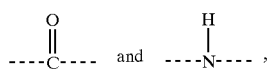

which are joined to one another as

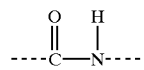

or are in conjugation with one another, and
a colorant of the formula

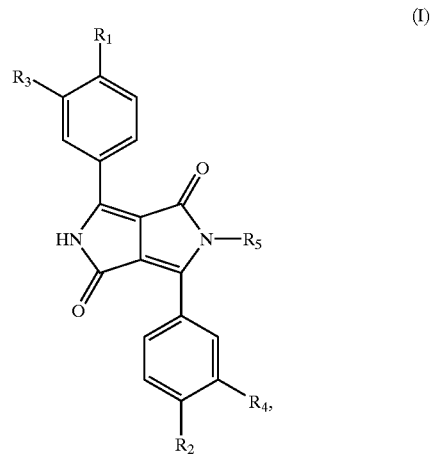

(I)

in which
R₁, R₂, R₃ and R₄ independently of one another are hydrogen, halogen, R₆, OR₆ or SR₆, R₅ is hydrogen or linear or branched $C_1$–$C_{12}$alkyl, benzyl or phenethyl, and R₆ is an apolar group which is unsubstituted or substituted one or more times by halogen or by $OC_1$–$C_6$alkyl, with the proviso that if R₅ is hydrogen, R₁, R₂, R₃ or R₄ is R₆, OR₆ or SR₆.

If $R_5$ is hydrogen then preferably at least two of $R_1$, $R_2$, $R_3$ and $R_4$ are $R_6$, $OR_6$ or $SR_6$. Preferred colorants of the formula (I) are those in which $R_1$ and $R_2$ are $OR_6$ or $SR_6$ and $R_3$ and $R_4$ are hydrogen, or in which $R_1$ and $R_2$ are hydrogen and $R_3$ and $R_4$ are $OR_6$ or $SR_6$. Particularly preferred colorants of the formula (I) are those in which $R_1$ and $R_2$ are $SR_6$ and $R_3$ and $R_4$ are hydrogen, or in which $R_1$ and $R_2$ are hydrogen and $R_3$ and $R_4$ are $SR_6$. These are particularly suitable in combination with diketopyrrolo[3,4-c]pyrroles, even so when $R_5$ is hydrogen.

$R_5$ is preferably $C_1$–$C_{12}$alkyl or benzyl and, with particular preference, is linear $C_1$–$C_{12}$alkyl.

$R_6$ is, for example, an apolar saturated, mono- or polyunsaturated or aromatic, substituted or unsubstituted hydrocarbon radical, preferably unsubstituted or halogen- or $OC_1$–$C_6$alkyl-substituted, linear or branched $C_1$–$C_{30}$alkyl, or $C_2$–$C_{30}$alkenyl. With particular preference $R_6$ is unsubstituted linear $C_1$–$C_{30}$alkyl.

$C_1$–$C_{30}$alkyl is, for example, methyl, ethyl, n-propyl, isopropyl, n-butyl, sec-butyl, tert-butyl, n-amyl, tert-amyl, hexyl, heptyl, octyl, 2-ethylhexyl, nonyl, decyl, dodecyl, tetradecyl, hexadecyl, octadecyl, tetracosyl or triacontyl. Halogen is for example iodine, fluorine, bromine or, preferably, chlorine.

For optimum results $R_1$, $R_2$, $R_3$ and $R_4$ can be tailored to $R_5$ (or vice versa). If $R_5$ is $C_5$–$C_{12}$alkyl, benzyl or phenethyl, then $R_1$, $R_2$, $R_3$ and $R_4$ are arbitrary and can, for example, all simultaneously be hydrogen. If $R_5$ is $C_2$–$C_4$alkyl, then there are preferably at least 6 carbon atoms in total in $R_1$, $R_2$, $R_3$, $R_4$ and $R_5$. If $R_5$ is methyl, there is preferably an alkyl or alkylene chain of at least 6 carbon atoms in $R_1$, $R_2$, $R_3$ or $R_4$. If $R_5$ is hydrogen, then there are preferably two alkyl or alkylene chains of at least 6 carbon atoms, or one alkyl or alkylene chain of at least 12 carbon atoms, in $R_1$, $R_2$, $R_3$ or $R_4$. A higher number of carbon atoms, or longer alkyl or alkylene chains, are generally advantageous.

The preferred minimum chain lengths of the substituents on the nitrogen and on the phenyl rings lead to a supposition of a connection with the polarity, which might, for example, have consequences for the solubility and the melting point. At any rate it is surprising that the absence from the chains of polar groups or groups which form hydrogen bonds, such as nitrogen atoms or carbonyl groups, is essential to achieve the desired effect. Likewise of essential significance, on the other hand, it is surprising that in formula (I) there should be at least one amide proton.

Preferably, the pigment has at least two each of groups

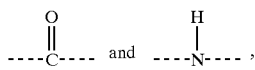

as for example in quinacridone pigments, disazo condensation pigments, isoindolinone pigments or 1,4diketo-2,5-dihydro-3,6diarylpyrrolo[3,4-c]pyrrole pigments, or else in Pigment Yellow 139 or Pigment Violet 37.

With particular preference the pigment is a 1,4-diketo-2,5-dihydro-3,6-diarylpyrrolo[3,4-c]-pyrrole pigment, especially a pigment of the formula

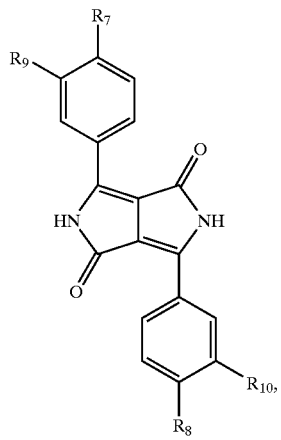

in which $R_7$, $R_8$, $R_9$ and $R_{10}$ independently of one another are hydrogen, halogen, cyano, carbamoyl, $C_1$–$C_4$alkyl or phenyl.

Very particular preference is given to pigments of the formula (II), in which $R_7$ and $R_8$ are hydrogen, chlorine or $C_1$–$C_4$alkyl and $R_9$ and $R_{10}$ are hydrogen, $C_1$–$C_4$alkyl, cyano or carbamoyl. In the case of $C_1$–$C_4$alkyl particular importance attaches to methyl and tert-butyl.

Per part by weight of pigment the amount of the colorant of the formula (I) is preferably from 0.001 to 9 parts by weight, with particular preference from 0.01 to 1 part by weight and, with very particular preference, up to 0.2 part by weight, in particular up to 0.1 part by weight.

The pigment preferably has a specific surface of more than 15 $m^2/g$, for example of 16 to 150 $m^2/g$. Particularly preferred, the pigment has a specific surface of at least 18 $m^2/g$, for example of 18 to 50 $m^2/g$ for a covering pigment or of 50 to 100 $m^2/g$ for a transparent pigment.

The compositions of the invention may include two or more pigments having groups

and

and/or two or more colorants of the formula (I) and/or may also include additional constituents, examples being customary additives or further colorants, such as inorganic white, black or colour pigments and/or other organic colour pigments. In particular, the compositions of the invention may also include compounds of the formula

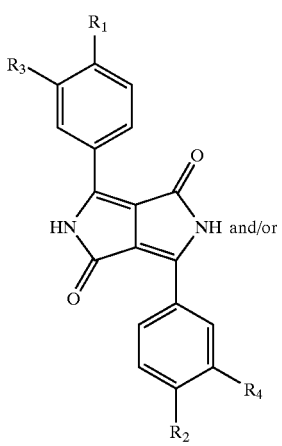

(Ia)

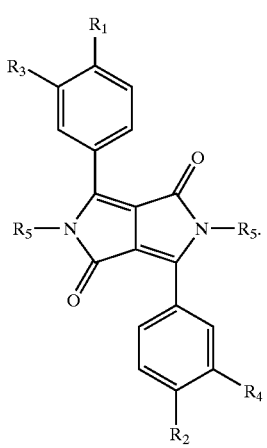

(Ib)

(Ib) is often formed alongside (I) in the alkylation of (Ia), so that (I), (Ia) and (Ib) are present as mixtures which can likewise be put to advantageous and efficient use in place of (I) alone, in which case their overall adequate amount is simply to be calculated for the desired amount of (I) taking into account the level of (I) in the mixture.

The invention therefore additionally provides a colorant composition consisting essentially of one or more pigments containing at least one each of groups

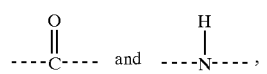

which are joined to one another as

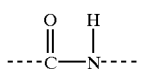

or are in conjugation with one another,
one or more colorants of the formula (I), and
if desired, one or more colorants selected from the group consisting of inorganic white, black and colour pigments, further organic colour pigments, and compounds of the formula

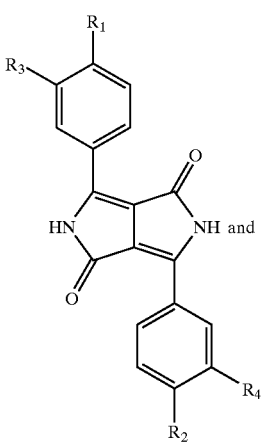

(Ia)

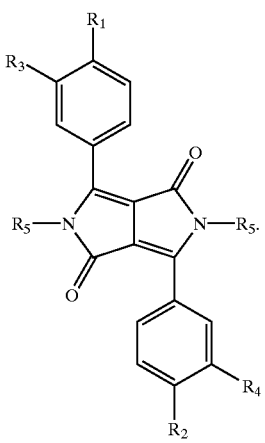

(Ib)

in which
$R_1$, $R_2$, $R_3$, $R_4$ and $R_5$ have the same meaning as in formula (I), with the same proviso.

By further organic colour pigments are meant those which contain no groups

and

joined to one another as

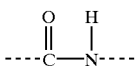

or in conjugation with one another.

This colorant composition may also have been mixed with an organic material or have such a material incorporated into it, being present, for example, as a ready-to-use mixture or as a masterbatch. The concentration of the colorant composition of the invention is preferably from 0.01 to 70% by weight, more preferably from 0.08 to 40% by weight and, with particular preference, from 0.1 to 10% by weight, based on the overall weight of the colorant composition of the invention and the organic material.

The organic material can be a partially crystalline plastic or else, especially in the case of masterbatches, can also comprise other, customary embedding materials, examples being amorphous plastics, such as LLDPE (linear low density polyethylene), waxes, other additives, such as stabilizers, or mixtures thereof. In masterbatches the concentration of the colorant composition of the invention is preferably from 5 to 70% by weight, based on the overall weight of the masterbatch.

By partially crystalline plastics are meant those which solidify to form small crystalline nuclei or aggregates (for example spherulites or quadrites), including those which do so only in the presence of nucleating agents (for example organic pigments).

Partially crystalline plastics are generally thermoplastic organic materials of high molecular mass with a molecular weight ($M_w$) of from $10^4$ to $10^8$, preferably from $10^5$ to $10^7$, and a degree of crystallinity ($X_c$) of from 10 to 99.9%, preferably from 40 to 99% and, with particular preference, from 80% to 99%. Preferred partially crystalline plastics are homopolymers and block or random copolymers and terpolymers of ethylene, propylene, butylene, styrene and/or divinylbenzene, especially α-olefins such as HDPE, LDPE, polypropylene and polystyrene, and also polyesters, such as PET, polyamides, such as nylon 6 and nylon 66, and thermoplastic ionomers.

Particularly preferred partially crystalline plastics are polyolefins, especially high density polyethylene, and polypropylene.

The partially crystalline plastics may also include additives in conventional amounts, examples being stabilizers, optical brighteners, fillers and/or lubricants.

The invention therefore also provides compositions consisting essentially of a partially crystalline plastic and a composition of the invention.

Preparation takes place by the conventional methods, for example by mixing the pigments and compounds of the formula (I) or a mixture thereof (without necessarily converting the colorants into a finished preparation beforehand) with the plastic in pellet or powder form and extruding the mixture into fibres, films or pellets. The latter can then, for example, be shaped by injection moulding to form particles which solidify with hardly any warping or in many cases no warping whatsoever.

In one particular embodiment of the invention, alternatively, the compounds of the formula (I) can be prepared in situ by carrying out only partial reaction of a diketopyrrolo[3,4-c]pyrrole pigment. Examples of reactions which proceed only partially on the surface of the pigment in the presence of the reactant in a substoichiometric amount are alkylation by a group $R_5$ on the nitrogen, and the nucleophilic substitution of compounds of the formula (I) in which one or more of $R_1$ to $R_4$ are halogen by alkoxylate or, in particular, by alkylthiolate.

Depending on its solubility in the solvent used, the compound of the formula (I) that is formed can be isolated from the solution phase, or else physical mixtures of the pigment and the compound of the formula (I) are produced, for example as solid-state mixtures or agglomerates. By choosing a solvent in which the compound of the formula (I) is of low solubility it is even possible to obtain particles consisting of a pigment core with a covering of the compound of the formula (I).

Although the latter composite structure is not necessary and is possibly altered or even destroyed in the course of injection moulding, it can of course be used in accordance with the invention in place of customary physical mixtures, with likewise excellent results.

The invention therefore also provides a method of bulk-dyeing partially crystalline plastics, which comprises using a pigment containing at least one each of groups

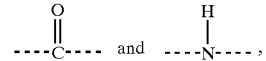

which are joined to one another as

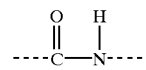

or are in conjugation with one another, and a colorant of the formula

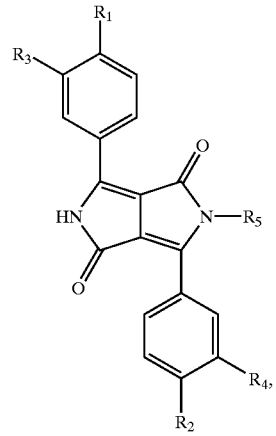

in which $R_1$, $R_2$, $R_3$ and $R_4$ independently of one another are hydrogen, halogen, $R_6$, $OR_6$ or $SR_6$, $R_5$ is hydrogen or linear or branched $C_1$–$C_{12}$alkyl, benzyl or phenethyl, and $R_6$ is an apolar group which is unsubstituted or substituted one or more times by halogen or by $OC_1$–$C_6$alkyl, with the proviso that if $R_5$ is hydrogen, $R_1$, $R_2$, $R_3$ or $R_4$ is $R_6$, $OR_6$ or $SR_6$.

The invention also provides a process for producing mass-coloured plastics, which comprises injection-moulding a partially crystalline plastic, a pigment containing at least one each of groups

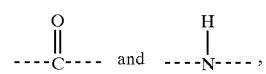

which are joined to one another as

or are in conjugation with one another, and a colorant of the formula

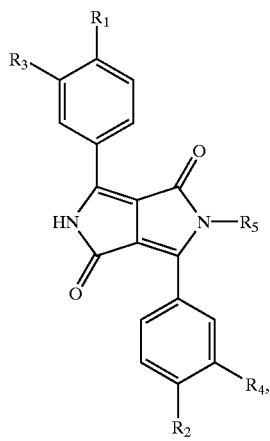

(I)

in which

R$_1$, R$_2$, R$_3$ and R$_4$ independently of one another are hydrogen, halogen, R$_6$, OR$_6$ or SR$_6$, R$_5$ is hydrogen or linear or branched C$_1$–C$_{12}$alkyl, benzyl or phenethyl, and R$_6$ is an apolar group which is unsubstituted or substituted one or more times by halogen or by OC$_1$–C$_6$alkyl, with the proviso that if R$_5$ is hydrogen, R$_1$, R$_2$, R$_3$ or R$_4$ is R$_6$, OR$_6$ or SR$_6$.

If desired it is also possible of course to use additives in the customary manner as further additions.

The constituents of the injection moulding formulation can either be added to the injection moulding machine in ready-premixed form or else simultaneously as individual components. It is advantageous that premixing, if desired, can be carried out with conventional and simple means, since it is not really necessary to mix the components intimately. It is also possible to premix two or more components and then to meter in that premix together with other, individual or likewise premixed components. In particular it is possible to use masterbatches, in which case, for example, colourless plastics pellets, pigmented plastics pellets, and pellets coloured with a compound of the formula (I) can be metered simultaneously into the injection moulding machine, together with or with the addition of additives, if desired. The person skilled in the art will immediately recognize how considerable gains in productivity are possible from this extremely surprising advantage of the invention.

The compositions of the invention can of course also be used for the bulk colouring of other high molecular mass organic materials, examples being other plastics, coating materials and printing inks.

The compounds of the formula (I) are partly known. The others can be prepared in close analogy to the known compounds.

Some compounds of the formula (I) are novel. The invention therefore additionally provides a compound of the formula

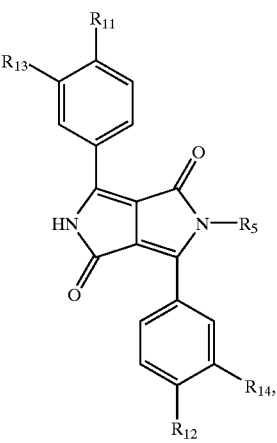

(III)

in which

R$_{11}$, R$_{12}$, R$_{13}$ and R$_{14}$ independently of one another are hydrogen, halogen, R$_{16}$, OR$_{16}$ or SR$_{16}$, R$_{15}$ is linear or branched C$_1$–C$_{12}$alkyl, benzyl or phenethyl, and R$_{16}$ is an apolar group which is unsubstituted or substituted by halogen or OC$_1$–C$_6$alkyl, wherein at least one of R$_{11}$, R$_{12}$, R$_{13}$ or R$_{14}$ is R$_{16}$, OR$_{16}$ or SR$_{16}$. The compounds of the formula (III) can be used as colorants.

The examples which follow elucidate the invention without restricting its scope (unless specified otherwise percentages are always by weight):

EXAMPLES 1–3

1.4 g of Irgazin® DPP Red BO (Pigment Red 254/Ciba Specialty Chemicals Inc.; 19±1 m$^2$/g), a compound of the formula (I) in the amounts specified in the table below, and 700 g of Stamilan® 9089U (HDPE/DSM) are dry-mixed in a tumble mixer for 10 minutes. The mixture is extruded in a single-screw extruder at 200° C. The resultant pellets are processed on an injection moulding machine at 240° C. to give panels measuring 174×49×2.5 mm. Following injection, the panels are thermally conditioned in a water-bath at 90° C. for 30 minutes and stored at room temperature (~23° C.) for at least 15 hours. Finally, the panels are measured precisely.

| Example | 1 | 2 | 3 |
|---|---|---|---|
| Amount of (I) | 0.07 g | 0.35 g | 0.35 g |

-continued

| Example | 1 | 2 | 3 |
|---|---|---|---|
| Structure of (I) | S-nC₁₂H₂₅ ... S-nC₁₂H₂₅ | S-nC₁₈H₃₇ ... S-nC₁₈H₃₇ | (structure with N-nC₄H₉ and two phenyl groups) |

In all cases the results obtained are identical to those with colourless Stamilan® 9089U. In contrast to the panels obtained with Irgazin® DPP Red BO alone, the panels obtained are almost completely warp-free.

EXAMPLES 4–6

The procedure of Example 1 is followed but using in each case 0.015 g, 0.03 g or 0.04 g of the compound of the formula (I), likewise with excellent results.

EXAMPLES 7–9

The procedure of Example 2 is followed but using in each case 0.015 g, 0.03 g or 0.04 g of the compound of the formula (I), likewise with excellent results.

EXAMPLES 10–12

The procedure of Examples 1–3 is followed but using as pigment 1,4-diketo-2,5-dihydro-3,6-di-(p-tert-butyl-phenyl)-pyrrolo[3,4-c]pyrrole instead of 1,4-diketo-2,5-dihydro-3,6-di-(p-chlorophenyl)-pyrrolo[3,4-c]pyrrole, likewise with excellent results.

EXAMPLES 13–14

The procedure of Examples 5–6 is followed but using Pigment Yellow 109 instead of 1,4-diketo-2,5-dihydro-3,6-di-(p-chlorophenyl)-pyrrolo[3,4-c]pyrrole, likewise with good results.

EXAMPLES 15–16

The procedure of Examples 13–14 is followed but using Pigment Yellow 110 instead of Pigment Yellow 109. The results are comparable.

BEISPIEL 17

5 g Colour Index Pigment Yellow 110 are dispersed with 0.55 g of the compound of formula (I) according to Example 1 in 100 ml of water and 25 ml of isopropanol for 4 hours. The product is isolated by filtration, washed with water, dryed at 80° C./3000 Paand finally injection-moulded with polyethylen according to example 1. The panels obtained are nearly warp-free.

EXAMPLE 18

The procedure of Example 17 is followed but using Pigment Yellow 109 instead of Pigment Yellow 110. The results are comparable.

EXAMPLES 19–21

The procedure of Examples 1–3 is followed but using Pigment Blue 15:1 instead of 1,4-diketo-2,5-dihydro-3,6-di-(p-chlorophenyl)-pyrrolo[3,4-c]pyrrole, likewise with good results.

EXAMPLES 22–24

The procedure of Examples 1–3 is followed but using Pigment Blue 15:2 instead of 1,4-diketo-2,5-dihydro-3,6-di-(p-chlorophenyl)-pyrrolo[3,4-c]pyrrole, likewise with good results.

EXAMPLES 25–26

1 mol of 1,4-diketo-2-n-butyl-5-hydro-3,6-di-(4'-chlorphenyl)-pyrrolo[3,4-c]-pyrrole, respectively 1 mol of 1,4-diketo-2-methyl-5-hydro-3,6-di-(4'-chlorphenyl)-pyrrolo-[3,4-c]pyrrole, is reacted with 2 mol of potassium n-dodecylthiolate in 1 l of dimethylacetamide for 5 hours at 130° C. The products of the following formulae are obtained:

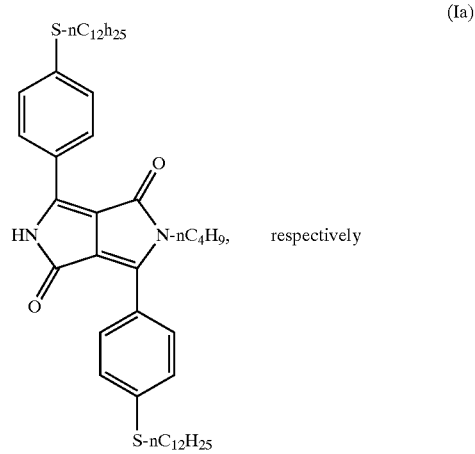

(Ia)

respectively

-continued

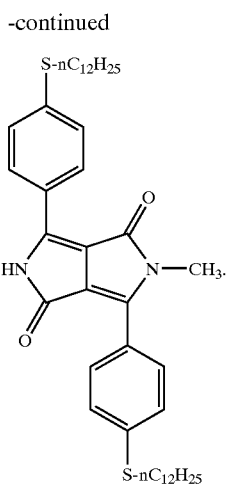

(Ib)

EXAMPLE 27

The procedure of Example 17 is followed but using Pigment Red 166 instead of Pigment Yellow 110 and 0.89 g instead of 0.55 g of the compounds of formula (I), whereby the results are also good.

What is claimed is:

1. A composition comprising a pigment containing at least two each of the groups

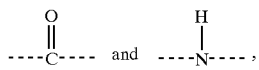

which are joined to one another as

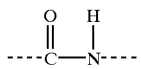

or are in conjugation with one another, which pigment is selected from the group consisting of quinacridone pigments, disazo condensation pigments, isoindolinone pigments, Pigment Yellow 139 and Pigment Violet 37, and from 0.001 to 1 part by weight, per part by weight of pigment, of a colorant of the formula

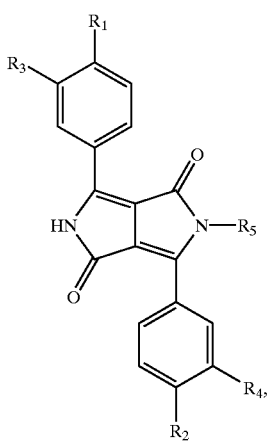

(I)

in which
$R_1$, $R_2$, $R_3$ and $R_4$ independently of one another are hydrogen, halogen, $R_6$, $OR_6$ or $SR_6$, $R_5$ is hydrogen or linear or branched $C_1$–$C_{12}$alkyl, benzyl or phenethyl, and $R_6$ is linear or branched $C_1$–$C_{30}$ alkyl or $C_2$–$C_{30}$ alkenyl which is unsubstituted or substituted one or more times by halogen or by $OC_1$–$C_6$alkyl, with the provisos that if $R_5$ is methyl, there is an alkyl or alkylene chain of at least 6 carbon atoms in $R_1$, $R_2$, $R_3$, or $R_4$, and if $R_5$ is hydrogen, $R_1$, $R_2$, $R_3$ or $R_4$ is $R_6$, $OR_6$ or $SR_6$ and there are at least two alkyl or alkylene chains each of at least 6 carbon atoms or at least one alkyl or alkylene chain of at least 12 carbon atoms, in $R_1$, $R_2$, $R_3$ and/or $R_4$.

2. A composition according to claim 1, which is a colorant composition consisting essentially of p1 one or more pigments containing at least two each of groups

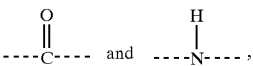

which are joined to one another as

or are in conjugation with one another, one or more pigments being selected from the group consisting of quinacridone pigments, disazo condensation pigments, isoindolinone pigments, Pigment Yellow 139 and Pigment Violet 37, one or more colorants of the formula (I), and if desired, one or more colorants selected from the group consisting of inorganic white, black and colour pigments, further organic colour pigments, and compounds of the formula

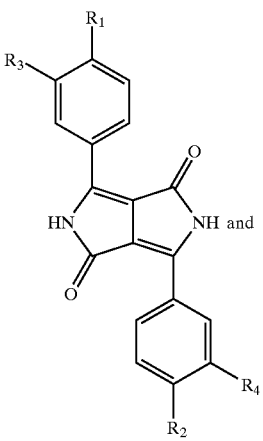

(Ia)

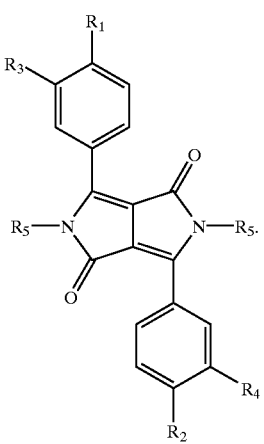

(Ib)

in which

R₁, R₂, R₃, R₄ and R₅ have the same meaning as in formula (I) according to claim 1.

3. A composition according to claim 1, additionally comprising an organic material, the total weight of pigments and other colorants being from 0.01 to 70% by weight based on the overall weight of pigments, other colorants and organic material.

4. A composition according to claim 1, wherein in formula (I) $R_1$ and $R_2$ are $OR_6$ or $SR_6$ and $R_3$ and $R_4$ are hydrogen, or wherein $R_1$ and $R_2$ are hydrogen and $R_3$ and $R_4$ are $OR_6$ or $SR_6$.

5. A composition according to claim 1, wherein, per part by weight of pigment, the amount of the colorant of the formula (I) is from 0.01 to 1 part by weight.

6. A composition according to claim 5, wherein, per part by weight of pigment, the amount of the colorant of the formula (I) is up to 0.2 part by weight.

7. A composition according to claim 3, wherein the organic material is a homopolymer or a block or random copolymer or terpolymer of ethylene, propylene, butylene, styrene and/or divinylbenzene, a polyester, a polyamide or a thermoplastic ionomer.

* * * * *